US008637773B2

(12) United States Patent
Jonsson et al.

(10) Patent No.: US 8,637,773 B2
(45) Date of Patent: Jan. 28, 2014

(54) ELECTRIC INSULATION DEVICE AND AN ELECTRIC DEVICE PROVIDED THEREWITH

(75) Inventors: Erik Jonsson, Trondheim (NO); Lars Palmqvist, Alingsås (SE); Ruslan Papazyan, Plovdiv (BG); Henrik Hillborg, Västerås (SE); Claire Pitois, Sundbyberg (SE)

(73) Assignee: ABB Research Ltd. (CH)

( * ) Notice: Subject to any disclaimer, the term of this patent is extended or adjusted under 35 U.S.C. 154(b) by 263 days.

(21) Appl. No.: 12/727,655

(22) Filed: Mar. 19, 2010

(65) Prior Publication Data

US 2010/0200274 A1 Aug. 12, 2010

Related U.S. Application Data

(63) Continuation of application No. PCT/EP2008/062632, filed on Sep. 22, 2008.

(30) Foreign Application Priority Data

Sep. 20, 2007 (EP) ..................................... 07116865

(51) Int. Cl.
*H01B 3/00* (2006.01)
(52) U.S. Cl.
USPC .................... 174/137 B; 174/137 R; 174/142; 174/152 R
(58) Field of Classification Search
USPC ........................ 174/137 R, 137 B, 152 R, 142
See application file for complete search history.

(56) References Cited

U.S. PATENT DOCUMENTS

| 3,883,680 | A | * | 5/1975 | Keen, Jr. .................. 174/12 BH |
| 4,401,841 | A | * | 8/1983 | Meyer et al. ................ 174/31 R |
| 5,281,767 | A | * | 1/1994 | West et al. ..................... 174/142 |
| 5,710,475 | A | * | 1/1998 | Irwin et al. ...................... 310/45 |
| 6,124,549 | A | * | 9/2000 | Kemp et al. .................. 174/73.1 |
| 6,235,992 | B1 | * | 5/2001 | Abisso et al. .............. 174/110 S |
| 6,664,314 | B1 | * | 12/2003 | Hajek et al. .................... 523/218 |
| 6,977,060 | B1 | * | 12/2005 | Merrill et al. ...................... 419/5 |
| 2003/0150639 | A1 | * | 8/2003 | Goehlich et al. .......... 174/137 B |
| 2004/0026670 | A1 | | 2/2004 | Nguyen et al. |
| 2005/0199418 | A1 | * | 9/2005 | Donzel et al. .................. 174/142 |
| 2007/0272432 | A1 | * | 11/2007 | Isberg et al. .............. 174/152 R |

FOREIGN PATENT DOCUMENTS

| EP | 0993238 | A1 | | 4/2000 | |
| EP | 1798740 | A1 | | 6/2007 | |
| EP | 1848009 | A1 | * | 10/2007 | ............. H01B 17/32 |

(Continued)

OTHER PUBLICATIONS

International Preliminary Report on Patentability; PCT/EP2008/062632; Jan. 14, 2010; 7 pages.

(Continued)

*Primary Examiner* — Hung S Bui
*Assistant Examiner* — James Wu
(74) *Attorney, Agent, or Firm* — St. Onge Steward Johnston & Reens LLC

(57) ABSTRACT

An electric insulation device, including a chamber and an electrically insulating element formed by a cast polymer solidified into an elastic state inside the chamber. The electrically insulating element includes a plurality of particles of a ceramic that has a higher thermal conductivity than the one of the polymer.

22 Claims, 2 Drawing Sheets

(56) References Cited

FOREIGN PATENT DOCUMENTS

| JP | 54061253 A | 5/1979 |
| JP | H07157664 A | 6/1995 |
| JP | H1143610 A | 2/1999 |
| JP | H11134944 A | 5/1999 |
| JP | 2001329173 A | 11/2001 |
| WO | WO 2005006355 A1 * | 1/2005 ............. H01B 17/26 |

OTHER PUBLICATIONS

International Search Report and Written Opinion of the International Searching Authority; PCT/EP2008/062632; Jan. 22, 2009; 9 pages.

* cited by examiner

ELECTRIC INSULATION DEVICE AND AN ELECTRIC DEVICE PROVIDED THEREWITH

CROSS-REFERENCE TO RELATED APPLICATIONS

The present application is a continuation of pending International patent application PCT/EP2008/062632 filed on Sep. 22, 2008 which designates the U.S. and claims priority from European patent application 07116865.2 filed on Sep. 20, 2007, the content of which is incorporated herein by reference.

FIELD OF THE INVENTION

The present invention relates to an electric insulation device, comprising: a chamber, and an electrically insulating element formed by a cast polymer solidified into an elastic state inside said chamber.

The invention also relates to an electric device for the transmission of medium or high voltage that comprises an electric insulation device according to the invention.

In this context medium or high voltage is referred to as voltages equal to or above approximately 1 kV.

The word "elastic" may be referred to as an ability of undergoing substantial change of shape, due to appearance of an external affection, and of subsequently returning to the original shape, upon removal or disappearance of said external affection, without any permanently remaining deformation. In this context it should be noted that, preferably, the elasticity module of said polymer is lower, preferably substantially lower, than that of adjacent elements with which the electrically insulating element may be in contact during use of said insulation device. Accordingly, the electrically insulating element is adapted to be elastically deformed due to changes of shapes or volumes of adjacent elements during its use, preferably without generally affecting the shape or volume of said adjacent elements and thereby permitting the altering of such shapes and volumes.

The polymer of said insulating element is defined as a "cast polymer", indicating that it has been introduced into said chamber in a liquid state, in order to be able to fill the latter well, in particular in those cases in which the latter has a complex geometric shape or in cases in which the latter houses elements that may have complex shapes and to which the insulating element is to adhere continuously or be in continuous contact with upon subsequent operation of an electric device provided with said insulation device.

Preferably, the electric device according to the invention may comprise any device from the group comprising circuit breakers, insulated switchgears, power distribution transformers, instrument transformers, surge arresters, cable terminations, pole heads, bushings, insulators and similar. In particular such electric devices form parts of a medium or high voltage distribution system.

BACKGROUND OF THE INVENTION

In some electric devices, such as circuit breakers, insulated switchgears, power distribution transformers, instrument transformers, surge arresters, cable terminations, pole heads, bushings, insulators and similar, there may be provided one or more volumes, or chambers filled with oil or an electrically insulating gas as an electrically insulating means. Oil has the advantage of being an efficient electric insulator and also being able of transmitting heat from heat-developing elements, such as the voltage-carrying elements in such devices. Since the oil is present in a liquid state, it has the advantage of being able to transmit heat by means of convection. However, the use of a liquid insulation such as oil may cause problems of leakage, and, as a consequence thereof, operation disturbances or even serious breakdowns. From an environmental point of view, oil is also undesirable.

Also when using insulating gases, such as SF6, as an insulating medium, there might be leakages that, in their turn, might result in operation disturbances or even breakdowns of equipment important for the transmission of current in medium and high voltage systems.

Accordingly, in order to remedy the drawbacks of prior art, recent search is focused on the development of dry insulations in which the oil, or gas, is substituted by a solid insulation element. Such solid insulation elements may comprise polymers such as polyurethanes or silicone-based polymers and may be present as a foam, a gel or even a rubber, depending on the specific application. The polymer should be possible to cast in the chamber or volume in which it is to be housed upon operation, in order to be able to continuously be in contact with or adhere to surrounding elements while leaving no pockets of air or other gas between itself and any such further element. However, a drawback of many polymers used for the forming of such insulation elements is their relatively low thermal conductivity, especially taken in combination with the fact that such solid insulation elements, unlike a liquid like oil, will be unable of transmitting heat through convection.

It is an object of the present invention to present an electric insulation device as initially defined, which presents an improved thermal conductivity compared to corresponding solutions of prior art.

SUMMARY OF THE INVENTION

The object of the invention is achieved by means of the initially defined electrical insulation device, characterised in that said element comprises a plurality of particles of a ceramic that has a higher thermal conductivity than the one of said polymer.

Here, "particles" are referred to as bodies or elements of such size and shape that they can be readily distributed in said polymer before the casting thereof, without affecting the viscosity of such a mixture such that the casting becomes inappropriate, e.g. results in discontinuous contact between insulating element and adjacent elements. Moreover, the particles should be of such kind that they do not sediment during the solidification of the polymer, but remain finely distributed in the matrix of the latter. Accordingly, such particles may be hollow, solid, elongated, sphere-shaped, cubic or of any other suitable shape for the specific purpose. They should have such surface properties and shapes that they will continuously adhere to the surrounding polymer matrix after solidification thereof, while leaving no voids or air pockets between themselves and the surrounding matrix. In principal, they should contain such material that they do not contribute to a decreased electrical insulation capacity of said insulation element.

According to a preferred embodiment, said particles are present in such an amount that the overall thermal conductivity of said element is increased with at least 10%, preferably at least 50%, and most preferred at least 100%.

Preferably, said ceramic has a thermal conductivity that is substantially higher than that of said polymer, preferably in the order of 10 000 times higher or more. A high thermal conductivity will reduce the amount of particles needed for a certain improvement of the thermal conductivity of the insulation element. Thereby, the viscosity of the polymer mixed with said particles before casting will be less affected by said particles, and, given that the price of the ceramic is higher than that of the polymer, the total production cost will be lowered. In order to compensate for the viscosity-increasing effect of said particles, a viscosity-decreasing agent, such as a silicone oil, may be added to the mixture that, upon curing of said polymer, will form said electrically insulating element. Such an agent may also improve the distribution of said particles, thereby in fact improving also the thermal conductivity of said element. The ceramic particles may have the shape of platelets and may have a mean diameter of 1-100 µm. They may, independently of their specific shape but preferably as said platelets, form agglomerates with a mean diameter in the range of 10-700 µm and presenting a more or less irregular three-dimensional shape, the particle size being measured by light diffusion technology, such as the Malvern Mastersized particle size analyzer.

According to further embodiments of the invention the volumetric proportion of the ceramic particles is at least 5 vol. %, preferably, at least 7 vol. %, and most preferably at least 9 vol. %. From approximately 5 vol. % of ceramic particles a reasonably high thermal conductivity of the material has been observed. The thermal conductivity then increases with increasing content of said ceramic particles.

According to further embodiments the volumetric proportion of the ceramic particles is below 15 vol. %, preferably below 13 vol. %, and most preferably below 11 vol. %. Above 11 vol. % of ceramic the contribution of said particles to an elevated viscosity becomes so high that it will have a definite negative effect on the material during manufacture thereof. Therefore, contents as defined above are preferred.

According to another embodiment, the ceramic particles form a plurality of individual agglomerates, and the mean diameter of the agglomerates is above 130 µm, preferably above 200 µm, and most preferably above 250 µm. It has been confirmed by tests made by the applicant that for contents of a ceramic of above approximately 5 vol. %, agglomerates with mean diameters as defined above result in an unexpected improvement of the thermal conductivity of material.

Preferably, said agglomerates are evenly distributed in said element. Thereby, local regions of inferior thermal conductivity are avoided. The agglomerates, or particles if not gathered in agglomerates, should be so distributed that the thermal conductivity does not vary more than +/-3% across the insulating element.

According to one embodiment, said particles form a percolating network in said element. If the particles form a percolating network, heat can be transmitted through unbroken paths of such material of elevated thermal conductivity. Thereby, the overall thermal conductivity of the insulating element might be sharply increased once the shapes and amount of said particles is enough for generating such a percolating network thereof.

Preferably, said ceramic comprises boron nitride as a main constituent. Boron nitride, in particular particles of hexagonal boron nitride, has proven to be well suited for the purpose of improving the thermal conductivity of an insulating element in accordance with the invention. In particular particles of boron nitride mixed with a silicone-based polymer that, after casting thereof, forms a gel has proven to be advantageous for the achievement of the object of the invention.

Preferably, said polymer forms a gel in its solidified state.

Preferably, said polymer is a silicone-based polymer, although other materials, and then preferably polyurethanes, might be conceived. According to one embodiment, said polymer comprises.

a) a crosslinkable polyorganosiloxane, and
b) an organosilicone crosslinker

An example of a crosslinkable polyorganosiloxane suitable for the purpose of the invention is given by the formula

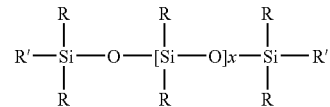

in which R is a monovalent hydrocarbon group having up to 18 carbon atoms, R' is a monovalent hydrocarbon or hydrocarbonoxy group, a hydrogen atom or a hydroxyl group, and x is an integer having a value of from 10 to 1500.

Examples of organosilicon crosslinker can be selected from silanes, low molecular weight organosilicon resins and short chain organosiloxane polymers.

According to a preferred embodiment of the invention, said insulating element comprises compressible particles distributed therein. The object of such particles is to make the whole insulating element compressible to a certain extent. Unlike solutions in which for example oil is used as the insulation means, wherein an expansion volume is used for adopting volume changes of the oil, the volume of the chamber in which the solid insulating element according to the invention is housed should be relatively constant, in order to guarantee that the solid element does not loose its contact with vital adjacent elements in said chamber upon changing operation conditions. Thus, the object of the compressible particles may be to compensate, by means of compression thereof, for any volumetric change of the polymer of said insulating element. Such volumetric change of the polymer may be induced by a change in temperature, resulting in a thermal expansion thereof, or by any alteration of the size or shape of elements, such as electric conductors, adjacent to the insulating element and housed in said chamber.

Preferably, each one of said compressible particles comprises an elastic shell that sealingly encloses a gas-filled inner volume thereof. The shell material should be compatible with the material of the surrounding polymer matrix in the insulating element, at least in the respect that it adheres thereto and does not cause voids between itself and said matrix as a result of volumetric or shape changes of the latter. Preferably, the compressible particles define micro-spheres having diameters ranging from 20 µm to 500 µm preferably from 30 µm to 100 µm. Said shells may comprise an organic polymeric material such as polyacrylonitrile, polyvinyl chlorides, polyvinyl acetates, polyesters, polycarbonates, polyethylenes, polystyrenes, polymethyl methacrylates, polyvinyl alcohols, ethylcellulose, nitrocellulose, benzylcellulose, epoxy resins, hydroxypropylmethylcellulose phthalate, copolymers of vinyl chloride and vinyl acetate, copolymers of vinyl acetate and cellulose acetobutyrate, copolymers of styrene and maleic acid, copolymers of acrylonitrile and styrene, copolymers of vinylidene chloride and acrylonitrile and similar substances.

Examples of suitable micro-spheres are those commercially available under the trade mark Dualite™ by Pierce and Stephens Corp., and those sold under the trade mark Expancel™ by Akzo Nobel.

Preferably, said compressible particles are present in said element in such an amount that they are able to fully compensate, by means of compression thereof, for any thermal expansion of said polymer of said element inside said chamber up to a maximum temperature that the insulation device will be subjected to during normal operation conditions thereof.

According to preferred embodiments of invention the amount of said compressible particles is at least 20 vol. %, preferably at least 24 vol. % of the material of said insulating element. Thereby, a sufficient compression of the insulating element is enabled for most applications, without any excessive pressure being exerted by said element on the surrounding structure.

According to further embodiments, the amount of said compressible particles is below 30 vol. %, preferably below 26 vol. % of the material of said insulating element. Thereby, enough room is left in the material of the insulating element to be occupied by the above-mentioned ceramic and to be occupied by any further additive, preferably a silicone oil.

According to one embodiment, said insulation device also comprises a voltage carrying element located in or adjacent to said chamber, wherein said element at least partly electrically insulates said electric voltage carrying element. The voltage carrying element may, typically, be a conductor for conducting medium or high voltage. Typically, the voltage carrying element may be covered by any further electric insulation that, accordingly, separates the insulating element of the invention from direct contact with the voltage carrying element. However, embodiments in which there is a direct contact between the insulating element of the invention and the voltage carrying element are also conceived.

According to a preferred embodiment said chamber is a closed chamber the volume of which changes less than does the volume of said polymer of said element due to temperature changes under normal operation conditions of said device. Preferably, the insulating element completely fills said chamber under all normal operation conditions of an electric device provided with the inventive electric insulation device. By virtue of the above-mentioned features, it is guaranteed that no voids or air pockets that might decrease the insulation capacity of said device are formed in the chamber during operation conditions.

According to one embodiment, said chamber is a closed chamber, the volume of which is generally constant under normal operation conditions of said device. In such cases the volume of the polymer matrix of the insulating element might change due to temperature changes, whereby the compressible particles distributed therein compensate, by means of a compression or expansion, for any such change of volume. However, if there are further elements the volumes of which vary during operation, and said further elements affect the volume of the chamber, without any temperature-induced volumetric change of the polymeric matrix in the insulation element being present, the compressible particles will guarantee that the insulating element compresses or expands in correspondence therewith.

The object of the invention is also achieved by means of the initially defined electric device for the transmission of medium or high voltage, characterised in that it comprises an electric insulation device according to the invention.

According to one embodiment, inside said chamber, the electric device comprises one or more elements other than said electrically insulating element, the shape or volume of which will change under normal operation conditions of said device, said one or more elements being in contact with and thereby affecting the shape or volume of said electrically insulating element.

According to one embodiment, said one or more elements other than the electrically insulating element comprise a medium or high voltage-carrying element.

According to one embodiment, said electric device comprises an electric cable termination, wherein said chamber is a chamber of said electric cable termination.

According to one embodiment, said electric device comprises an electric power transformer and said chamber is a chamber of said electric power transformer.

According to one embodiment, said electric device comprises an electric power bushing and said chamber is a chamber of said electric power bushing.

According to one embodiment, said electric device comprises an electric power breaker and said chamber is a chamber of said electric power breaker.

The invention may also include a method of producing an insulation device or electric device according to the invention, wherein said polymer is cast into said chamber and let solidify therein.

Further features and advantages of the invention will be explained in the following detailed description.

BRIEF DESCRIPTION OF THE DRAWINGS

A preferred embodiment of the invention will now be described, by way of example, with reference to the annexed drawing, on which.

DETAILED DESCRIPTION OF THE INVENTION

Figure 1:
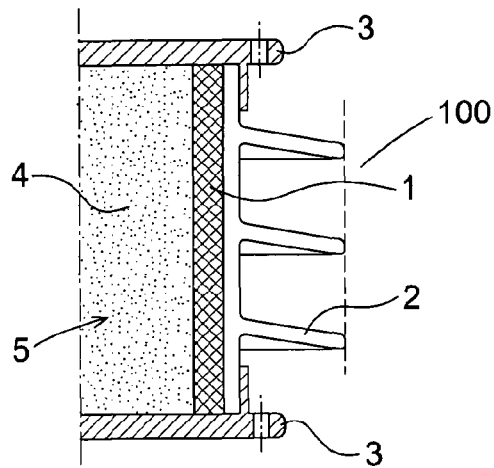
FIG. 1 is a cross-sectional view of an electric device according to the invention.

As illustrated in FIG. 1, the electric device of the present invention is described with particular reference to a supporting insulator; such embodiment has to be considered by way of explanatory and non-limiting example.

As illustrated in FIG. 1, an insulator, generally designated by the reference numeral 100, comprises an insulating tube 1 made of insulating composite material, for instance fiberglass, covered with insulating sheds 2, for example made of silicone rubber; at the ends of the tube 1 two metallic flanges 3 are fixed. Said tube 1 and flanges 3 delimit or enclose a chamber 5. When the insulator is under voltage, said two metallic flanges have different electric potential; in order to achieve electric insulation between the two flanges having different voltage thus avoiding dangerous electric discharges, the chamber 5 defining a free volume V inside the tubular case 1, is filled with a suitable dielectric filler.

Advantageously in the present embodiment of the invention, said dielectric filler is profitably made of a compressible silicone-based composition thereby forming an electrically insulating element 4; in particular, said compressible silicone-based composition is injected inside the tube 1 in a liquid state and at larger amount than the allowed maximum volume by means of a suitable device, not illustrated by figures. More precisely, being V the free volume to be filled, the injected compressible silicone-based composition has a volume ranging from 1.01 and 1.20 V, at a temperature of 25 DEG C. Since the filler being injected is at liquid state, it fully saturates all the suitable volume; the injected silicone-based composition is then cured to a gel state. In this phase since the filler volume is larger than the volume V to be filled, a perfect adhesion of the silicone filler to all contact surfaces with the tube is facilitated. Considering the good compressible performance this also occurs when the device undergoes wide temperature variations, for instance, ranging from −40 DEG C to +70 DEG C, without breakage, cracking or separation from the walls. Advantageously this allows dielectric strength levels of the device generally higher than those achievable by already known electric device and also a high dielectric strength value along said contact surfaces.

According to a preferred embodiment of the invention the dielectric filler comprises a silicone-based polymer filled with compressible microspheres, preferably those commercially available under the name of Expancel™. The polymer and the microspheres are of a kind that, upon curing of the polymer, will form a silicone gel like the one commercially available under the name of Com Gel, manufactured by Wacker. Prior to casting and curing of the polymer, particles mainly comprised by boron nitride should be added up to a volumetric amount of 10 volume % of the mixture. Here, said boron nitride comprises hexagonal boron nitride, such as the one produced by the company Saint Gobain. Preferably, a viscosity-reducing agent is also included in the mixture. According to a preferred embodiment, such an agent may include a low viscosity silicone oil. In the preferred embodiment 20 volume % of a low viscosity silicone oil (TR-50 (50 cSt), is therefore included in the mixture. Thereby, the viscosity is reduced, and the dispersion of the BN particles in the mixture is improved, thereby improving the thermal conductivity of the element to be formed. The liquid mixture, as described above, is introduced in the chamber or volume in which it cures and forms a filler, i.e. an electrically insulating element, in accordance with the teachings of this application.

Said gel can be advantageously used as insulating filler in several electric devices such as circuit breakers, insulated switch-gears, power and measuring transformers, surge arresters, cable terminations, pole heads, bushings, insulators and similar.

Figure 2:
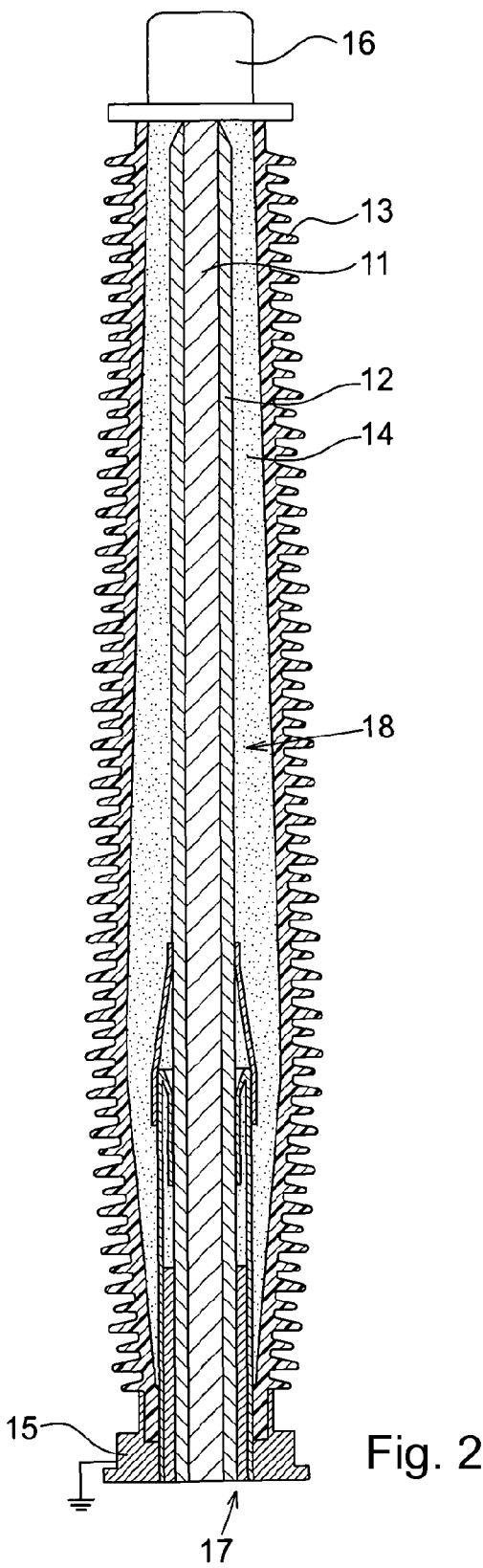
FIG. 2 is a cross-sectional view of another embodiment of an electric device according to the invention.

FIG. 2 shows an embodiment of a cable termination arrangement according to the present invention. The cable termination arrangement of FIG. 2 comprises a conductor 11, an internal electric insulation 12, an external encapsulation 13, and an intermediate electrically insulating element 14. At opposite ends of the external encapsulation 13 there are provided a bottom flange 15 and a top cap 16 respectively.

The conductor 11 is rod-shaped or tube-shaped. Preferably, it comprises a material of high electric conductivity such as copper or aluminium. Moreover, the conductor 11 forms part of a cable, wherein the internal insulation 12 is a typical cable insulation, made of a solid dielectric material such as a polymer, attached to the outer periphery of the conductor 11.

A cable 17 formed by the conductor 11 surrounded by the internal insulation 12 enters the cable termination arrangement through an end thereof formed by the bottom flange 15. The bottom flange 15, the top cap 16 and the external encapsulation 13 defines a housing that delimits a chamber 18 through which the conductor 11 of the cable 17 extends. The conductor 11 exits said housing through the top cap 16. Outside the top cap 16, the conductor 16 is not covered by any internal electric insulation but freely exposed to the surrounding, and either running freely or connected to any further electric equipment (not shown).

The external encapsulation 13 of the embodiment shown in FIG. 2 is provided for the purpose of preventing electrical surface flash-over at the outer periphery of the cable termination arrangement, thereby defining an external electric insulation. For this purpose, the external encapsulation preferably has a characteristic wave-shape as is well known per se within this technical field, and comprises a suitable material. The external encapsulation 13 may comprise an electrically insulating material such as a polymer, for example silicon, or porcelain. The length of the external encapsulation 13 in the axial direction of the conductor 11/cable 17 is adapted to the breakdown strength thereof. Accordingly, the length of the external encapsulation 13 will have to be increased with increasing voltage of the conductor.

The intermediate electric insulating medium 14 is formed by an electrically insulating element according to the invention and provided inside the above-mentioned chamber 18 and fills the latter. Thereby, the intermediate electric insulation element 14 is located in a spacing between the cable 17 and the external encapsulation 13. It acts as an electric insulator and a heat transferring medium, transferring heat from the conductor 1 out through said housing in a radial as well as an axial direction. Thereby, it will have a decisive effect upon the temperature of the internal insulation 12, which preferably comprises a polymer material. In this preferred embodiment the intermediate electric insulation 14 comprises a solid or semi-solid filling compound in accordance with the teachings of this patent application. Preferably, the intermediate insulation element 14 has been introduced into the housing in a way corresponding to the one described for the filler 4 with reference to FIG. 1.

The improved thermal conductivity of the intermediate insulation 14 has proven to greatly improve the functionality of the cable termination.

From the above description it is thus evident that the electric device of the present invention achieves the intended task and objects since it guarantees improved performances compared to already known electric devices, avoiding at the same time occurring of electric discharges; furthermore, the electric device thus conceived, can be used with wide temperature functioning ranges without requiring compensating volumes or surface treatments with adhesion promoters.

It must be pointed out that inside the electric device, functional elements, such as cables, mechanical rods, connections under voltage and so on, can be easily inserted; besides it is free of filler leakage problems and allows the elimination of monitoring and signaling systems of the leakage.

Figure 3:
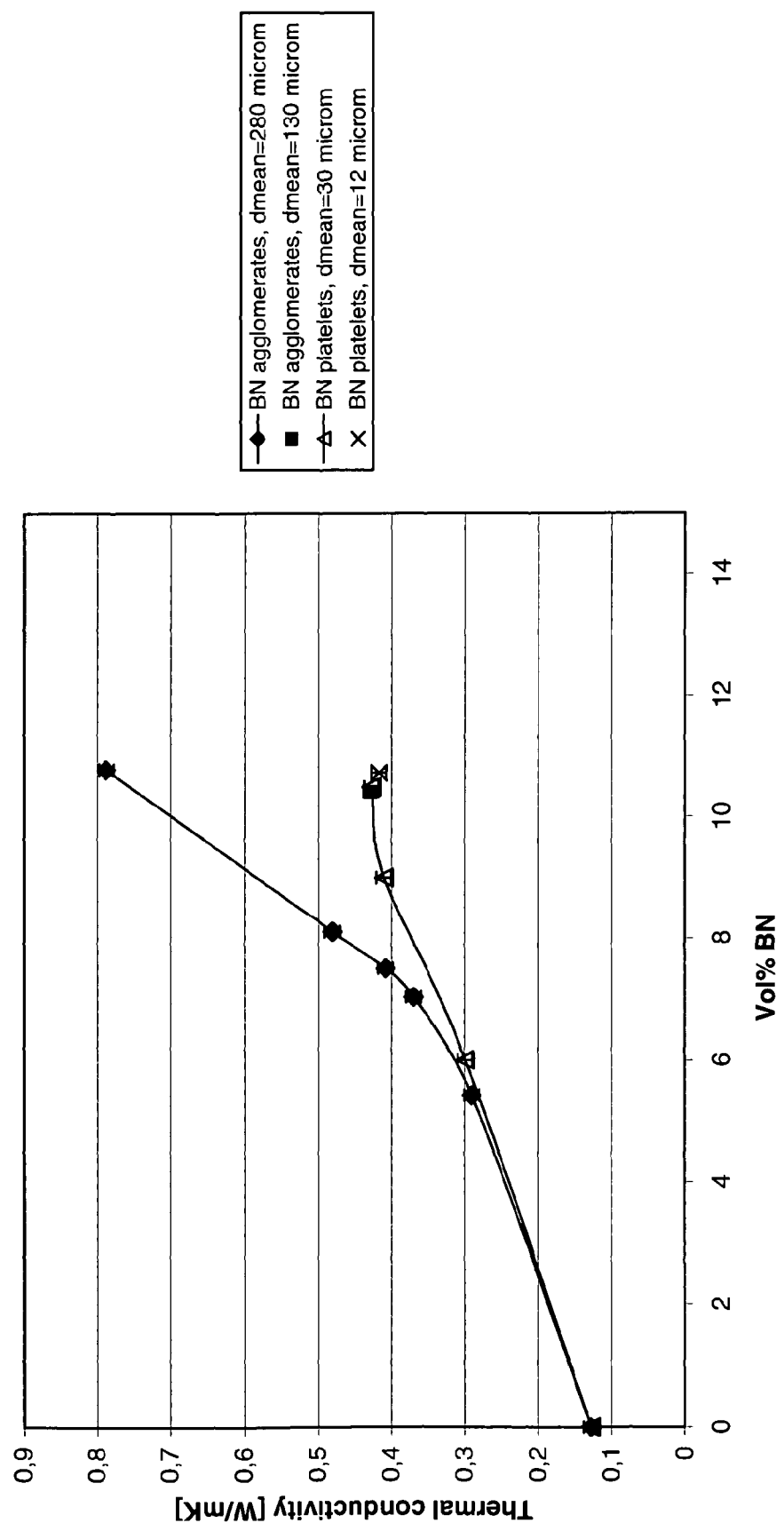
FIG. 3 is a diagram showing test results regarding the thermal conductivity versus volumetric percentage of BN in samples of an electrically insulating material according to the invention.

FIG. 3 shows test results obtained for different samples of an electrically insulating material in accordance with the invention, with different amounts of BN added to a polymer, and with different BN agglomerate sizes. As can be seen from the test, there is a remarkable and unexpected improvement of the thermal conductivity of the material from above approximately 5 vol. % of BN-agglomerates of 280 µm mean diameter. The agglomerates with a mean diameter of 130 µm presented a similar relation as the 280 µm samples up to approximately 5 vol. % of BN. However, the thermal conductivity of the 130 µm mean diameter samples was found to continue to be generally proportional to the amount of BN up to approximately 9 or 10 vol. % of BN, and then to deviate to lower value, while the samples with the larger agglomerates deviated into a steeper curve for BN contents above 5 vol. %.

It is also noteworthy that the mean sizes of the platelets of the individual BN particles seemed to be less relevant to the thermal conductivity obtained. Mean diameters of 12 µm and 30 µm respectively were used for different samples of the 130 µm agglomerates, and no significant difference in thermal conductivity was observed.

The invention thus conceived has been described with reference to particular and preferred embodiments, however it is not limited to what was described, but embraces the variants and modifications which falling within the scope of the inventive idea.

Finally all the details may be replaced by other technically equivalent elements.

What is claimed is:

1. An electric insulation device, comprising:
a chamber; and
an electrically insulating element formed by a cast polymer solidified into a gel inside said chamber, said electrically insulating element includes:
compressible particles in the form of micro-spheres having a diameter ranging from 20 μm to 500 μm distributed therein, and
a plurality of particles of a ceramic that has a higher thermal conductivity than a thermal conductivity of said polymer,
wherein a volumetric proportion of the ceramic particles is at least 5 vol. % and below 15 vol. and a volumetric portion of the compressible particles is at least 20 vol. % and below 30 vol. %;
wherein each one of said compressible particles comprises an elastic shell that sealingly encloses a gas-filled inner volume thereof and the ceramic particles form a plurality of individual agglomerates, and a mean diameter of the agglomerates is above 130 μm.

2. The electric insulation device according to claim 1, wherein the volumetric proportion of the ceramic particles is at least 7 vol. %.

3. The electric insulation device according to claim 1, wherein the volumetric proportion of the ceramic particles is below 13 vol. %.

4. The electric insulation device according to claim 1, wherein said agglomerates are evenly distributed in said electrically insulating element.

5. The electric insulation device according to claim 1, wherein said ceramic comprises boron nitride.

6. The electric insulation device according to claim 1, wherein said polymer is a silicone-based polymer.

7. The electric insulation device according to claim 1, wherein said polymer comprises:
a) a crosslinkable polyorganosiloxane, and
b) an organosilicone crosslinker.

8. The electric insulation device according to claim 1, further comprising a voltage carrying element located in or adjacent to said chamber, wherein said electrically insulating element electrically insulates said electric voltage carrying element.

9. The electric insulation device according to claim 1, wherein said chamber is a closed chamber the volume of which changes less than does the volume of said polymer of said element due to temperature changes.

10. The electric insulation device according to claim 1, wherein said chamber is a closed chamber, the volume of which is constant.

11. An electric device for the transmission of medium or high voltage, further comprising the electric insulation device according to claim 1.

12. The electric device according to claim 11, comprising one or more elements positioned inside said chamber other than said electrically insulating element, the shape or volume of which will change during operation of said device, said one or more elements being in contact with and affecting a shape or volume of said electrically insulating element.

13. The electric device according to claim 12, wherein said one or more elements other than the electrically insulating element comprise a medium or high voltage-carrying element.

14. The electric device according to claim 11, further comprising an electric cable termination and said chamber is a chamber of said electric cable termination.

15. The electric device according to claim 11, further comprising an electric power transformer and said chamber is a chamber of said electric power transformer.

16. The electric device according to claim 11, further comprising an electric power bushing and said chamber is a chamber of said electric power bushing.

17. The electric device according to claim 11, further comprising an electric power breaker and said chamber is a chamber of said electric power breaker.

18. The electric insulation device according to claim 1, wherein the volumetric proportion of the ceramic particles is at least 9 vol. %.

19. The electric insulation device according to claim 1, wherein the volumetric proportion of the ceramic particles is below 11 vol. %.

20. The electric insulation device according to claim 1, wherein the ceramic particles form a plurality of individual agglomerates, and that the mean diameter of the agglomerates is above 200 μm.

21. The electric insulation device according to claim 1, wherein the ceramic particles form a plurality of individual agglomerates, and that the mean diameter of the agglomerates is above 250 μm.

22. The electric insulation device according to claim 1, wherein the amount of said compressible particles in said electrically insulating element is at least 24 vol. % and below 26 vol. % of the material of said electrically insulating element.

* * * * *